(12) United States Patent
Peterson (10) Patent No.: US 7,673,697 B2
(45) Date of Patent: Mar. 9, 2010

(54) SOD LAYING MACHINE

(76) Inventor: Jonathan Michael Peterson, 8326 Wyoming Trail, Chisago City, MN (US) 55013

(*) Notice: Subject to any disclaimer, the term of this patent is extended or adjusted under 35 U.S.C. 154(b) by 52 days.

(21) Appl. No.: 10/056,250

(22) Filed: Jan. 23, 2002

(65) Prior Publication Data
US 2003/0136565 A1    Jul. 24, 2003

(51) Int. Cl.
*A01B 45/00*    (2006.01)

(52) U.S. Cl. .......................... 172/19; 172/20; 242/422.5

(58) Field of Classification Search .................. 172/19, 172/20; 180/900, 305, 308; 414/24.6; 242/557, 242/422.4, 422.5, 403, 919
See application file for complete search history.

(56) References Cited

U.S. PATENT DOCUMENTS

| | | | | |
|---|---|---|---|---|
| 2,661,708 A | * | 12/1953 | Pittman | ....................... 111/170 |
| 3,306,390 A | * | 2/1967 | Jamme | ....................... 180/209 |
| 3,941,265 A | | 3/1976 | Nunnally, Jr. | |
| 3,982,711 A | * | 9/1976 | Bradley et al. | ........... 242/559.3 |
| 4,084,763 A | | 4/1978 | Zamboni | |
| 4,149,640 A | | 4/1979 | White | |
| 4,354,556 A | | 10/1982 | Evans | |
| 4,363,374 A | * | 12/1982 | Richter et al. | ................ 180/209 |
| 4,599,030 A | * | 7/1986 | Skaalen et al. | ............... 414/460 |
| 4,754,815 A | | 7/1988 | Brouwer et al. | |
| 4,878,542 A | | 11/1989 | Brouwer et al. | |
| 4,890,801 A | | 1/1990 | Brouwer et al. | |
| 5,129,462 A | | 7/1992 | Mail | |
| 5,215,278 A | | 6/1993 | Hess | |
| 5,251,429 A | * | 10/1993 | Minato et al. | ................. 56/17.2 |
| 5,307,880 A | | 5/1994 | Woerner | |
| 5,437,528 A | | 8/1995 | Decker | |
| 5,454,433 A | | 10/1995 | Worrel et al. | |
| 5,518,079 A | * | 5/1996 | Zvolanek | .................... 180/19.1 |
| 5,571,252 A | | 11/1996 | Worrel et al. | |
| 5,697,452 A | | 12/1997 | Link | |
| 5,988,289 A | | 11/1999 | Holland et al. | |
| 6,131,668 A | * | 10/2000 | Houska | ....................... 172/253 |
| 6,179,060 B1 | * | 1/2001 | Halter | .......................... 172/19 |
| 6,213,218 B1 | * | 4/2001 | Miller | .......................... 172/19 |

OTHER PUBLICATIONS

Magnum 136A Big Roll Installer literature from http://www.bucyrusmagnum.com/magnum 136a.htm.
Central Sod Farms, Inc. Sod Installer—Multi-Mac literature from http://www.centralsod.com/installer.htm.

* cited by examiner

*Primary Examiner*—Robert E Pezzuto
(74) *Attorney, Agent, or Firm*—Patterson, Thuente, Skaar & Christensen P.A.

(57) ABSTRACT

A sod-laying machine having a low center of gravity and a seated operator position adjacent the roll of sod being placed. The superior visibility available to the operator makes it possible to place the sod more accurately and with less need for subsequent adjustment than has been possible previously. The machine has sod roll lifting arms that can be spaced apart to lift and place rolls having any of the common large sod roll widths. The machine can be configured to lay sod that is rolled with either the grass side or the dirt side outermost. Propulsion, roll lifting and roll width adjustment is hydraulic with continuously variable speed drive. Turf scuffing is minimized by trailing caster wheels and independently controllable drive wheels mounted close to the location of the sod roll.

20 Claims, 8 Drawing Sheets

SOD LAYING MACHINE

RELATED APPLICATIONS n/a

GOVERNMENT SPONSORED RESEARCH n/a

TECHNICAL FIELD

The present invention is part of the field of outdoor power equipment, generally, and turf care machinery more specifically. The embodiment is most particularly related to sod laying apparatus for laying large rolls of sod.

BACKGROUND

Sod has traditionally been considered a luxury or an expensive necessity when its installation was required. With increasing concern about soil erosion, the uncertainty and difficulty of establishing seeded areas, and sod prices that have lagged the prices of most other items in the U.S. economy, however, individuals and organizations are becoming more receptive to the idea of installing sod. Recently, harvesters have become available that make large rolls of sod rather than the traditional 18 in. wide and 72 in. long roll. The availability of large rolls of sod has reduced the costs to harvest, load, transport, and install sod by reducing labor to that required using traditional nine square foot rolls. A large sod roll 30 in. wide and 180 ft. long has 50 square yards and a 42 in. wide roll 260 feet long contains 100 sq. yards.

Such rolls may be desirable and have advantages such as lower cost to harvest, but they are too massive for individual persons to manage without the assistance of mechanical devices. Machinery for cutting large rolls of sod has developed more quickly than has the machinery for installing those rolls, although several workers have introduced models for the purpose of laying large rolls of sod.

U.S. Pat. No. 5,697,452 to Link titled "Sod Roll Laying Apparatus and Method" issued Dec. 26, 1997 and shows a machine that holds the sod roll in front but requires the operator to stand at the rear. The Link machine wheels are configured to travel over the soil as the machine is moved in reverse while the sod unrolls. Although the lift arms can break down stacked sod rolls, the operator cannot view the sod being laid. In addition, the sod roll cannot be conveniently positioned closer to obstacles than the length of the machine. The operator must dismount to inspect the roll or cut sod from it.

U.S. Pat. No. 5,307,880 to Woerner for a "Sod Roll-Out Machine with Endless Tracks" issued May 3, 1994. The device is a walk-behind vehicle that is likely to cause scuffing when turns are made over turf or surfaces that have been prepared to received sod.

U.S. Pat. No. 5,215,278 to Hess issued Jun. 1, 1993 for his "Apparatus for Laying Turf." The Hess machine is a tractor-pulled device that supports a large sod roll over a multiplicity of transversely coaxially mounted powered wheels. An endless rotating track is interposed between the top of the wheels and the bottom of the sod roll. The track supports the sod roll and causes the roll to rotate so as to dispense sod from a trailing chute. A separate machine must be used to load the roll onto the apparatus.

U.S. Pat. No. 4,754,815 issued to Brouwer et al. Jul. 5, 1988 for their "Sod Laying Machine." The Brouwer machine is an articulated-steering machine that holds the sod roll in front of the advancing machine so that the machine wheels pack the turf as it unrolls. The narrow wheel spacing and elevated sod roll position necessitates outrigger wheels for stability.

What is needed is a sod laying machine that has a relatively low center of gravity.

A further need is for a sod laying machine that allows an operator to sit close to the sod roll so that it is easy to see the placement of the roll relative to previously placed sod.

Another need is for a sod laying machine that can carry the sod roll generally between the drive wheels.

A still further need is for a sod laying machine that has continuously variable speed drive with higher speeds for transport and lower speeds for sod placement.

Yet another need is for a sod laying machine that is quickly and easily hydraulically adjustable so that sod rolls of varying widths may be placed without the necessity of obtaining different machines or engaging in time-consuming change-over procedures.

Also needed is a sod laying machine that does not traverse freshly placed sod before any desired manual placement, adjustment, or relocation tasks can be completed.

SUMMARY

What is needed, then, is a self-propelled, operator-carrying, vehicular sod laying machine for supporting, transporting, placing and unrolling sod rolls upon a surface comprising a frame having a forward end, a rearward end, a left side, and a right side, a plurality of wheels mounted to the frame for rolling transport of the frame along a surface, a front wheel being located proximate the forward end at the right side, a front wheel being located proximate the forward end at the left side, and at least one rear wheel being located proximate the rearward end, a pair of generally parallel, laterally displaceable, elongated arms disposed between the front wheels and extending forwardly from the frame forward end, each of the arms having a roll end and a pivot end, the pivot end being pivotably attached to the frame to pivot on an axis parallel to the axis of the front wheels to cause vertical displacement of the roll end of the arms, a sod roll supporting shaft attachable to the roll ends of the arms, and a drive system for pivoting the arms and rotating the wheels.

Such a sod laying machine may have an operator control station proximate the forward end of the frame, the control station including controls for pivoting the arms for vertical movement of the forward ends, controls for lateral movement of the arms to vary the distance between the arms, and controls for the speed and direction of the wheel rotating drive system. The operator control station may also include an operator-carrying seat. Hydraulic drive means may be provided for laterally displacing the arms to accommodate a plurality of sod roll widths and for pivoting the arms to raise and lower a sod roll.

The drive means for rotating the wheels may be comprised of independently controllable hydraulic motors rotatably attached to the front wheels. The rear wheels may be idler caster wheels to minimized gouging and scuffing freshly laid turf or soil surface that has been prepared to receive sod. The drive means for rotating the wheels may have a multiplicity of drive speeds including higher speeds for sod roll transport and lower speeds for sod roll placement and may include continuously variable speed hydraulic motors.

Accordingly, it is an object of the invention to provide a sod laying machine that has a relatively low center of gravity.

It is another object to provide a sod laying machine that allows an operator to sit close to the sod roll so that it is easy to see the placement of the roll relative to previously placed sod.

It is a further object to provide a sod laying machine that can carry the sod roll generally between the drive wheels.

A still further object is to provide a sod laying machine that has continuously variable speed drive with higher speeds for transport and lower speeds for sod placement.

Yet another object is to provide a sod laying machine that is quickly and easily hydraulically adjustable so that sod rolls of varying widths may be placed without the necessity of obtaining different machines or engaging in time-consuming change-over procedures.

It is also an object to provide a sod laying machine that does not traverse freshly placed sod with the machine wheels before any desired manual placement, adjustment, or relocation tasks can be completed.

It is a further objective of the invention to provide a sod-laying machine that may also be fitted with other implements such as a rotary broom, which may be useful for cleanup upon conclusion of sod laying activity at many typical job sites. A snow blower or a snow plow which may also have hydraulic swing, lift, and/or tilt controls may extend the usefulness of the machine into seasons when sod laying cannot be performed. Existing attachments such as those adapted to fit skid-steer vehicles may be useable with this sod laying machine. Standard hydraulically driven attachments can be connected directly to the machine without using adaptor devices or making modifications to either machine or attachment. Although not depicted, roll bars or cages may also be fitted. An enclosed cab may make it possible to use the machine in cold or other adverse weather conditions rather than idling the machine for a season or just to await better conditions.

The drive motors may be powered by a pump driven, for example, by an internal combustion engine having about 15 to 25 horsepower although a variety of other propulsion mechanisms could be employed equivalently. Fuel and/or oil tanks may be formed within box frame members disposed upon or integral with the frame at the forward end. The box frame members may have drive wheel axles attached and may also contain drive chains that are drivingly linked to hydraulic drive motors. Alternatively, hydraulic motors may be hub-mounted coaxially with the drive wheels. The drive mechanism could alternatively use belts that may be parts of continuously variable transmissions or gears and shafts, or combinations of these components.

The sod laying machine is designed to enhance stability, although it must be understood that improper use of the machine could create hazardous conditions including serious accidents. The vehicle center of gravity is designed to be low by mounting the engine and other heavy components as close to the ground as appears practical. Liquids are constrained from lateral displacement by orienting elongated tanks fore and aft rather than side-to-side. The sod roll is held close to, or in contact with, the ground surface when sod is being laid rather than being held in an elevated position as it is unrolled which may prevent the weight of the roll from causing the machine to tip to one side on uneven terrain. Drive wheels are spaced-apart laterally outwardly from the ends of the sod roll (or edges of the sod strip) with the drive wheel axis parallel to, and close to, the axis of the roll. The weight of the roll can be prevented from causing toppling of the sod laying machine if reasonable care is exercised.

The front drive wheels support about 70% of the weight of the empty machine in addition to the entire weight of the rolled sod plus the counter balanced amount of the weight shifted from the caster wheels by lifting the sod roll on the opposite side of the drive wheel fulcrum from the rear wheels. By configuring most of the weight on the driving wheels little on the un-powered caster wheels, this sod laying machine achieves excellent traction without the necessity of using expensive tracks, a large number of driving wheels, or other costly traction enhancing techniques. Flotation tires give good traction without damaging the turf or the prepared surface and enable the machine to climb hills whether empty or fully loaded. Good traction is particularly important when returning uphill to the sod supply location to retrieve a full roll for laying. Transport while empty is difficult with some commercially available models. Side-hill travel transverse to the direction of the slope while laying sod also is much easier to accomplish if there is sufficient weight and traction on both drive wheels. Of course each drive wheel, if driven by hydraulic motors, will have power at all times the machine is in motion and will turn at the speed and in the direction selected by the operator, unlike propulsion systems that include a differential in the final drive. This machine could be made to operate that way, but braking would be necessary to steer or else the caster wheels would need to be made steerable. Selectively engageable drive belts or other clutch assemblies could also be used in lieu of differential or hydraulic motor power.

A sod-laying machine having a low center of gravity and a seated operator position adjacent the roll of sod being placed is disclosed. The superior visibility available to the operator makes it possible to place the sod both faster and more accurately than has been possible previously. Turf scuffing is minimized by trailing caster wheels and independently controllable drive wheels mounted close to the location of the sod roll. This steering method contributes to the accurate placement of sod. The operator can control the position of the machine relative to previously placed material with exactness and can manipulate the position of the roll with great precision because the roll is always parallel and close to drive wheel axis. Spacing of the sod roll lifting arms can be adjusted to fit any of the common large sod roll widths. The machine can be configured to lay sod that is rolled with either the grass side or the dirt side outermost. Propulsion, roll lifting and roll width adjustment is hydraulic with continuously variable speed drive.

DETAILED DESCRIPTION

Figure 1:
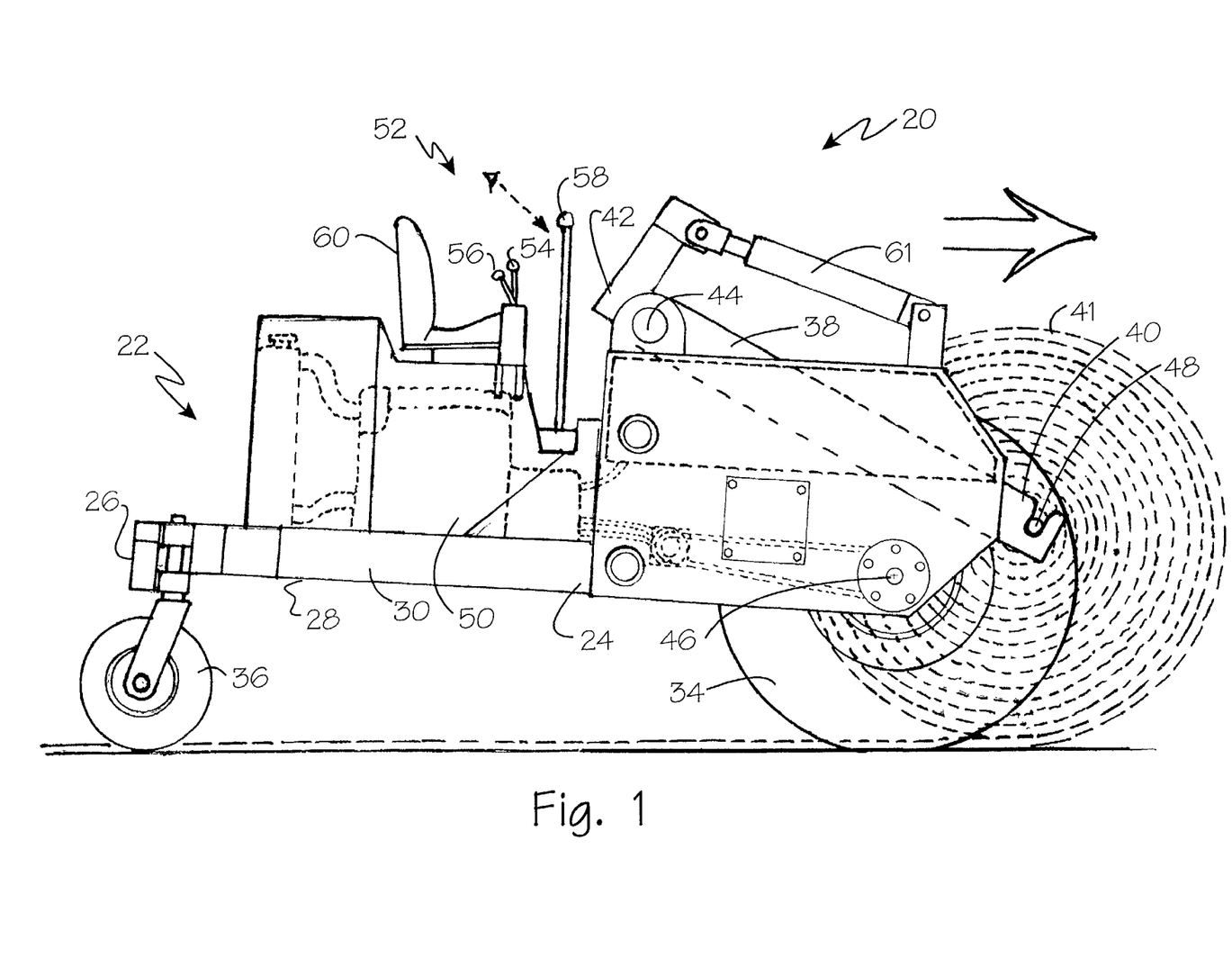
FIG. 1 is a right side elevation of an embodiment of the invention.

Turning first to FIG. 1, there is shown a self-propelled, operator-carrying, vehicular sod laying machine 20 having a frame 22, a forward end 24, a rearward end 26, a left side 28, and a right side 30. A plurality of wheels are mounted to the frame 22 include a right front wheel 32 (removed in this figure to permit viewing of other elements) that is like the left front wheel 34 in all important respects. At least one rear wheel 36 is located proximate the rearward end 26. If a single rear wheel 36 is provided, it will necessarily be medially located at the rearward end 26. However, if two rear wheels 26 are provided, the wheels can be spaced apart to track the front drive wheels 32 34.

A pair of generally parallel, laterally displaceable, elongated arms 38 are disposed between the front wheels 32 34 and extending forwardly from the frame forward end 24, each of the arms having a roll end 40 for lifting a roll of sod 41 and a pivot end 42. The pivot end 42 of the arms is pivotably attached to the frame 22 to pivot on an axis 44 parallel to the front wheels axis 46 to cause vertical displacement of the roll end 40 of the arms 38. A sod roll supporting shaft 48 is attachable to the roll ends 40 of the arms by any means, including the hooks depicted or any other equivalent structure.

A drive system 50, or prime mover, can include a diesel engine such as a 15 to 25 horsepower three cylinder diesel engine for economical operation, a gasoline engine for lower initial cost, and electric motor with batteries, fuel cells or other source of power, or other device for producing motive power for pivoting the arms 38 and rotating the front wheels 32 34.

An operator control station 52 near the forward end of the frame provides the operator with an excellent view of the sod roll 41 as it is being installed and convenient access to slice the roll to length at the end of each row without it being necessary for the operator to leave the controls. Although usual sod materials can be easily cut to length with a handheld knife or cutter, it is possible that power operated cutters would be preferred for cutting strips of the required length from rolls if the soil or the turf were particularly tough. The controls include a roll lift control 54 and a drive wheel width control 56 for moving the drive wheels 32 34 closer together for narrow (e.g. 30 in.) rolls 41 and farther apart when wider (e.g. 42 in.) rolls 41 are being installed. Although not specifically depicted, it is to be understood that the sod laying machine can easily be adapted to carry and install sod in rolls of 48 in. width (or any other reasonable width) The roll lift control 54 enables the operator to raise and lower the roll 41 for transport and installation by pivoting the arms 38. A speed and direction control 58 can independently control the rotational speed of the drive wheels 32 34 in order to provide steering to the machine 20. An operator-carrying seat 60 may be provided to enable the operator to be more comfortable. A hydraulic cylinder 61 is a convenient means for pivoting the arms about the pivot axis 44. If desired, a hydraulic cylinder 61 may be fitted to the pivot end 42 of each roll lifting arm 38.

Figure 2:
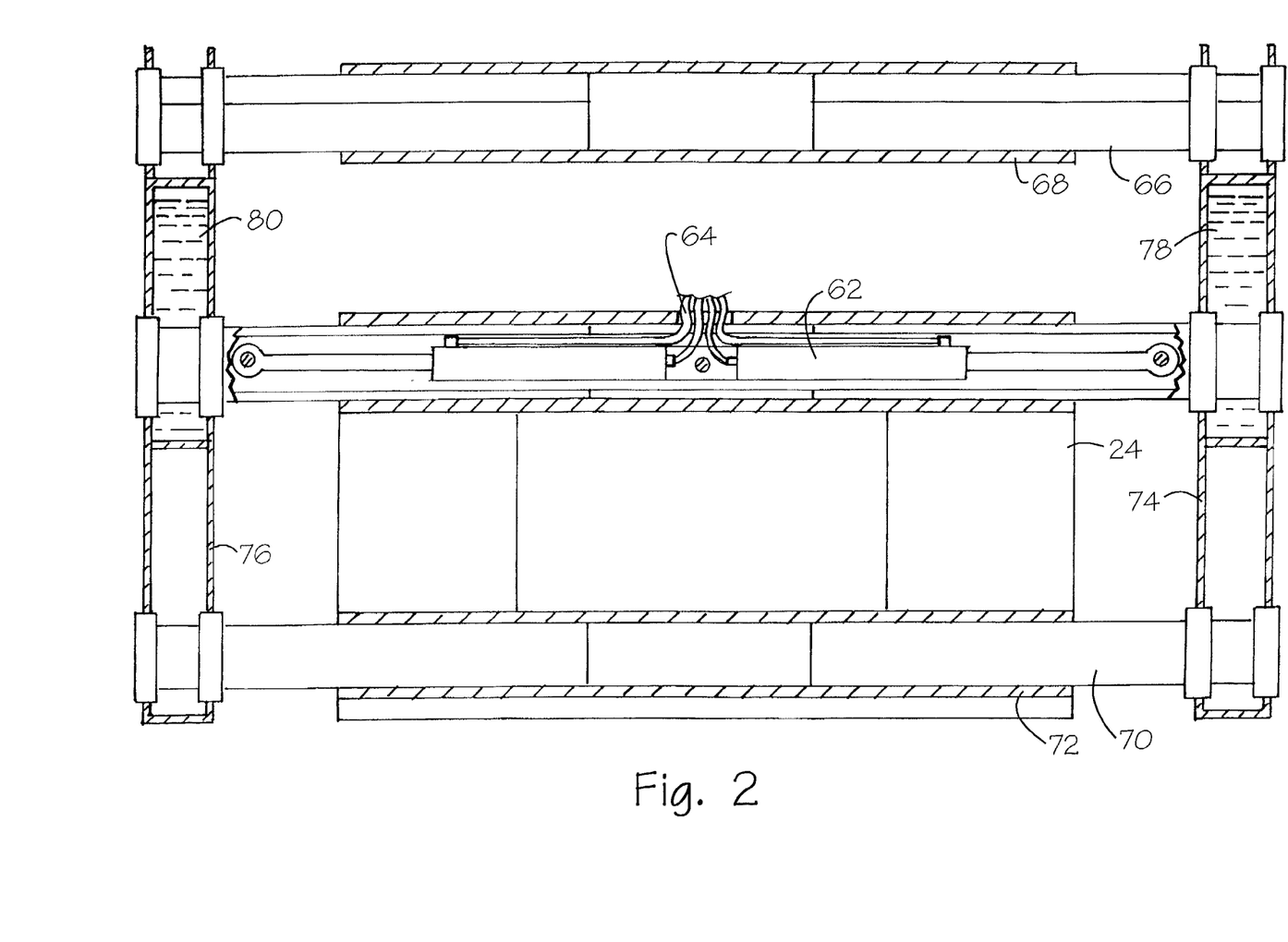
FIG. 2 is a sectional view of the hydraulic width adjustment mechanism of the embodiment of FIG. 1.

In FIG. 2, a detail shows a hydraulic drive means, for example, a hydraulic cylinder 62 for laterally displacing the arms 38 to accommodate a plurality of sod roll 41 widths. It is to be understood that other means including screw elements, cable tackle, winches, ropes, levers, and the like may be, and are expected to be equivalent for the purposes of this apparatus and for varying the spacing between the drive wheels 32 34. Hydraulic power hoses 64 may interconnect the control 56 with the cylinder 62 if hydraulic means are used to adjust the spacing of the drive wheels and arms 38. A single cylinder 62 may be used satisfactorily to adjust spacing between the arms by linking the ram to slidable telescoping members 66 70 on the leftward side 28 of the forward end 24 and linking the cylinder to the slidable telescoping members 66 70 on the rightward side 30 of the front 24 of the frame 22. Alternatively, two hydraulic cylinders 62 may be aligned with the cylinder portion (normally, but the ram portion operates equivalently in this instance) attached medially at the forward end 24 proximate with the upper 68 and lower fixed member 72 and the ram portions attached to complementary slidable telescoping portions 66 70, as illustrated.

The width varying components are affixed to forward end 24 of the frame and can include an upper telescoping member 66 that is slidably supported by an upper fixed member 68 affixed to the frame forward end 24. It is possible to include a left and a right telescoping member 66 which may have the pivot ends 42 of the arms 38 affixed and may further include a slidable torque transfer element such as a splined shaft and coupling to lift both arms 38 with a single cylinder 61.

A lower telescoping member 70 is slidably disposed, preferably on both the left side 28 and the right side 30 along a lower fixed member 72 that is affixed to the forward part of the frame 24. A left drive wheel box frame 74 and a right drive wheel box frame 76 support the forward end 24 of the frame 22 and may include a left tank 78 and a right tank 80 which may hold fuel, hydraulic oil, or other materials.

Figure 3:
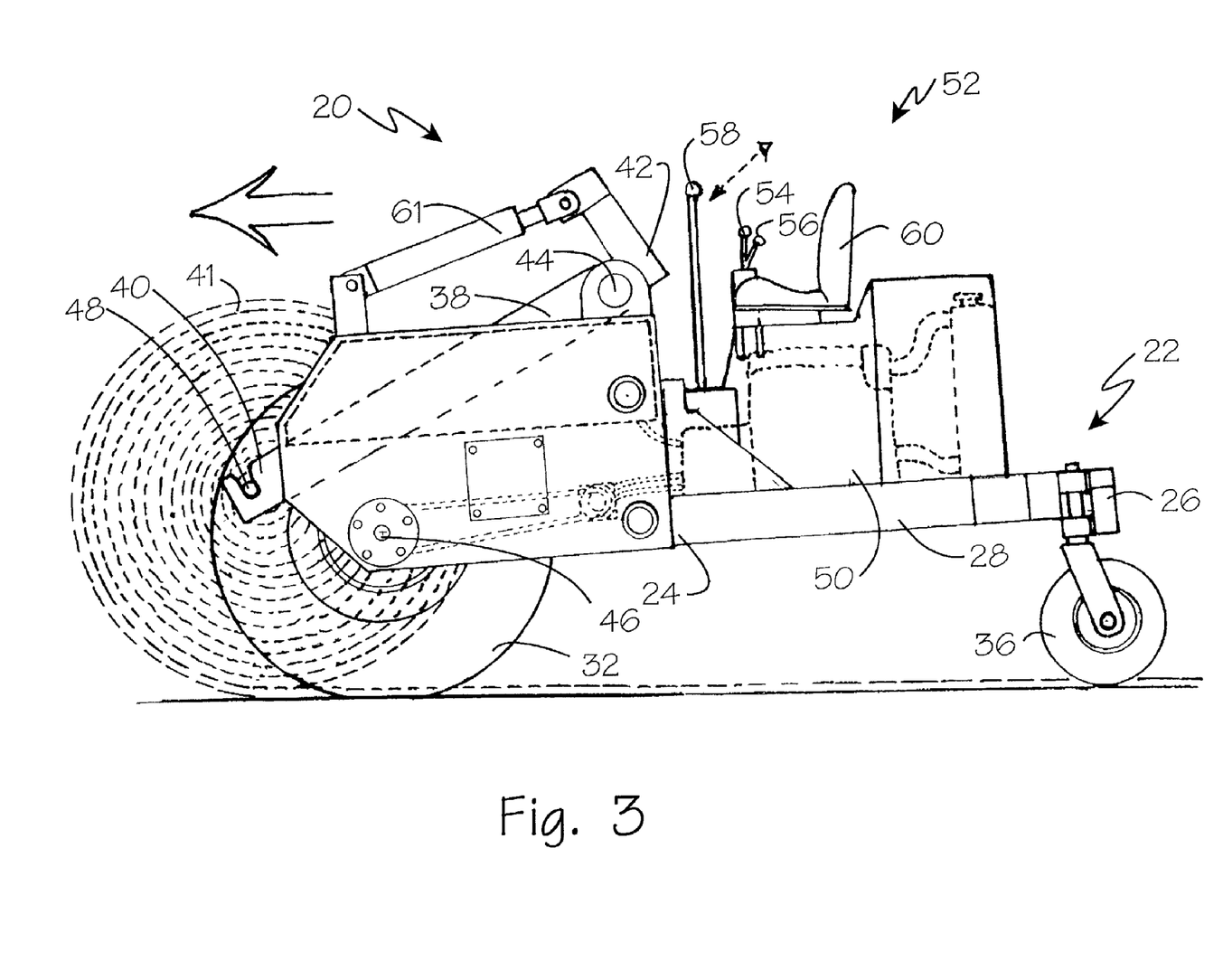
FIG. 3 is a left side elevation of the embodiment depicted in FIG. 1.

Viewing now FIG. 3, there is a left elevation of the sod laying machine 20. A hydraulic motor 82 is driven by a hydraulic pump 84 which is in turn driven by a prime mover 86 which can be any form of heat engine electric motor, or other device that delivers motive power directly or indirectly to the wheels 32 34 such as, for example through a drive chain or belt 88. When used, the chain 88 can rotate the wheel 32 34 on the drive wheel spindle 90.

An idler caster assembly 92 allows the rear wheels 36 to pivot freely so as to avoid scuffing the turf or the prepared surface on which the sod roll 41 is placed.

Figure 4:
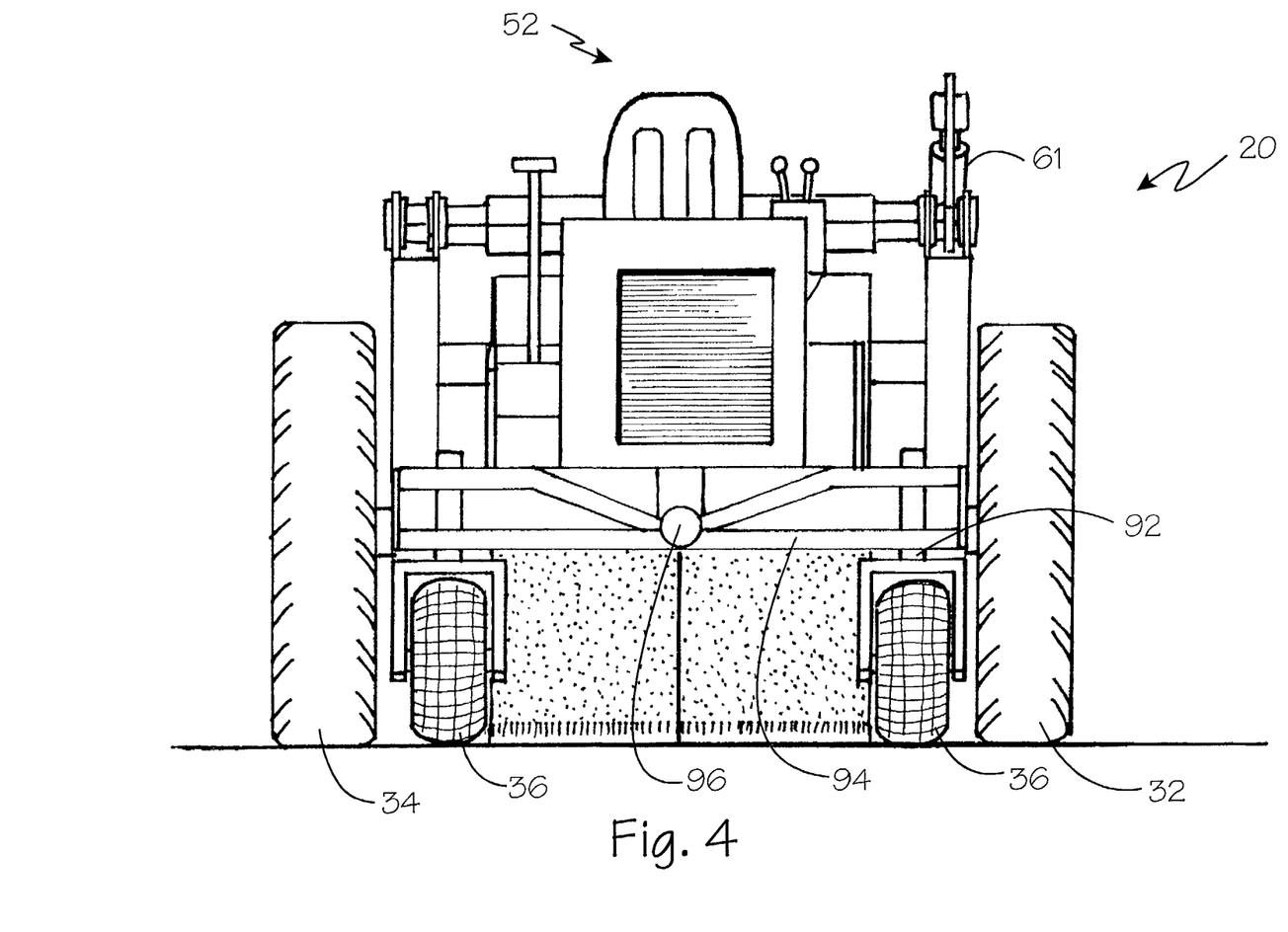
FIG. 4 is a rear elevation of the embodiment depicted in FIG. 1.

In FIG. 4 there is a view of the elongated rocking beam 94 having a caster wheel assembly 92 at each end and a rocking pivot 96 in the middle to enable all four wheels to remain in contact with the support surface, regardless of whether irregularities in the surface are encountered.

Figure 5:
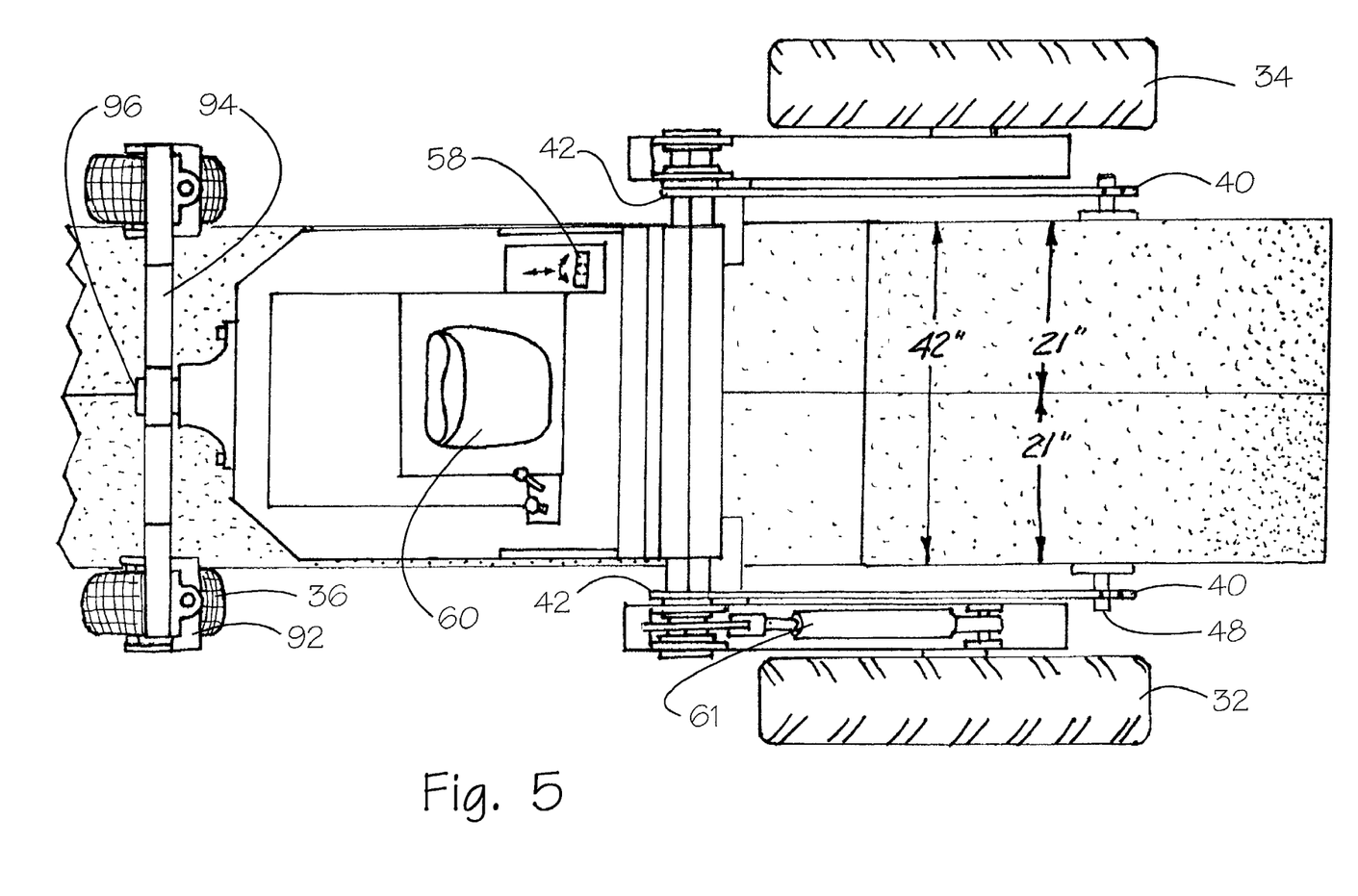
FIG. 5 is a top plan view of the embodiment depicted in FIG. 1 wherein the apparatus is configured to lay rolls of sod that are 42 inches wide.

FIG. 5 shows the rocking beam 94 and pivot 96 in plan view. Also shown is the sod laying machine 20 configured to install a sod roll 41 that is 42 inches wide.

Figure 6:
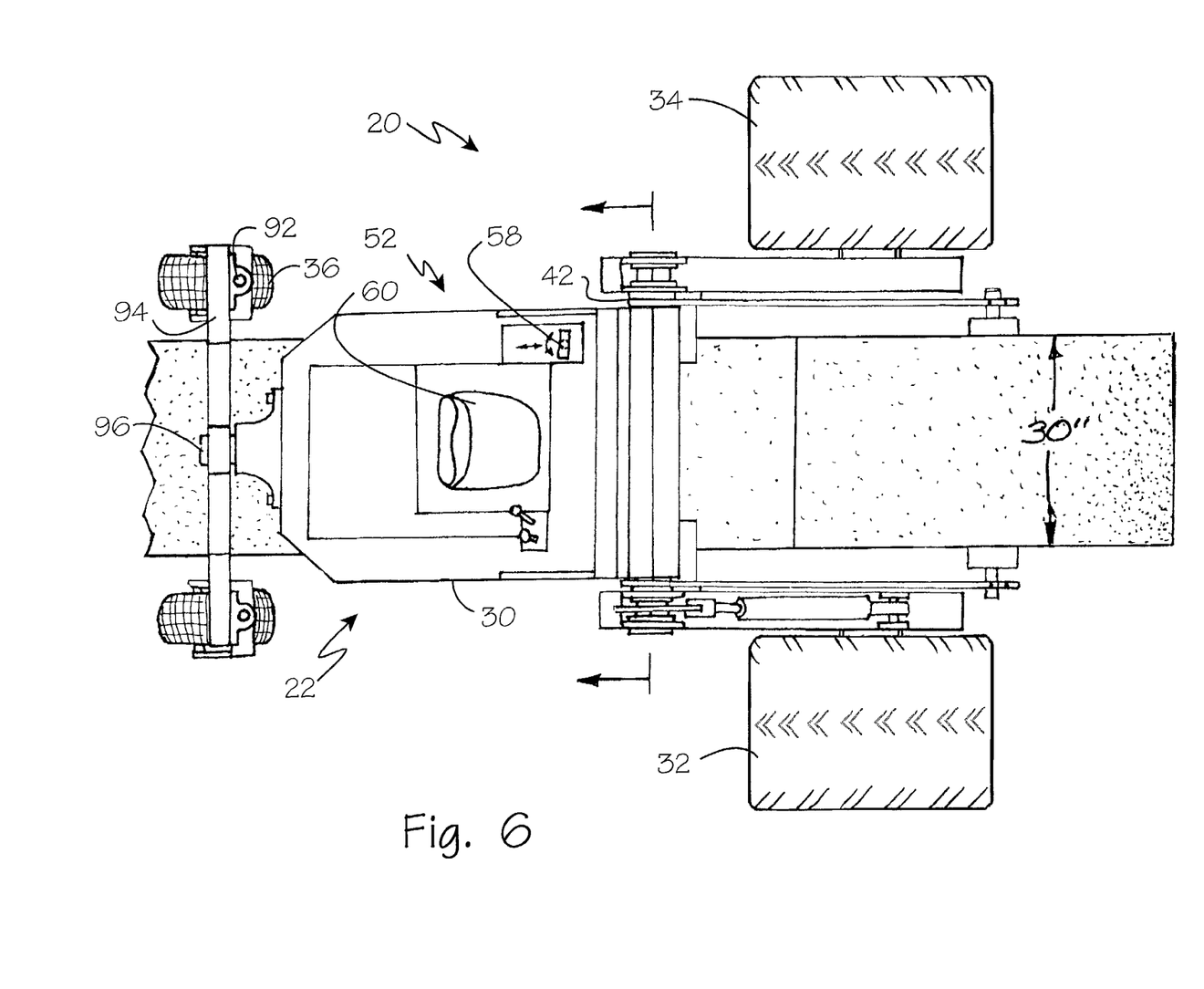
FIG. 6 is the top plan view of FIG. 4 wherein the apparatus is configured to lay rolls of sod that are 30 inches wide and an optional style of drive wheel is fitted with flotation tires having smaller diameter and wider tread.

FIG. 6 shows a plan view of the sod laying machine 20 with the arms 38 and drive wheels 32 34 spaced narrowly to install a sod roll 41 that is 30 inches wide. In this view, also, the drive wheels 32 34 are depicted as being flotation-type tires. Such tires may be used in standard configurations of the machine.

Figure 7:
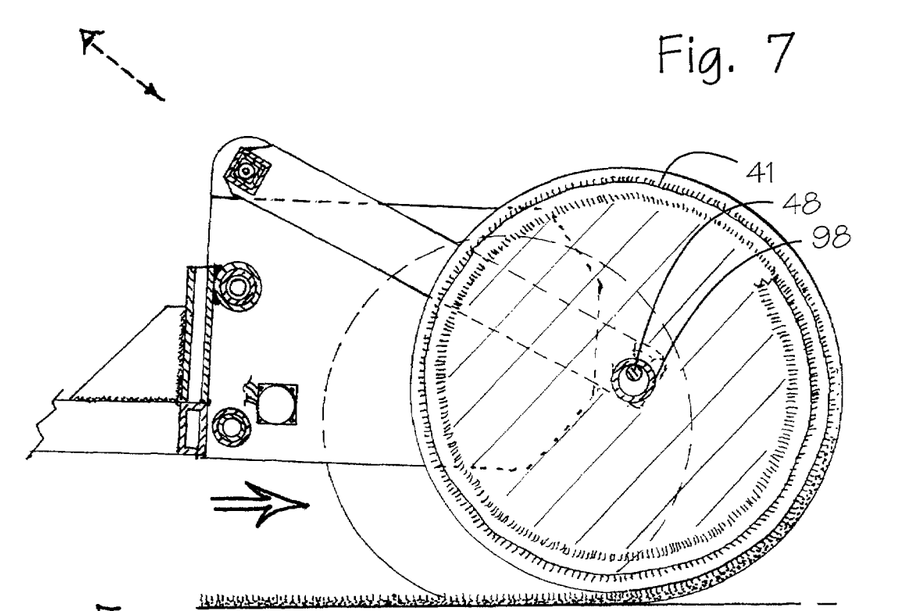
FIG. 7 is a side sectional detail of the sod roll handling mechanism of the embodiment depicted in FIG. 1.

FIG. 7 shows a section of the machine 20 front end and sod roll 41 with the shaft 48 supporting a sod roll core 98 which is typically located at the start of each sod roll 41.

Figure 8:
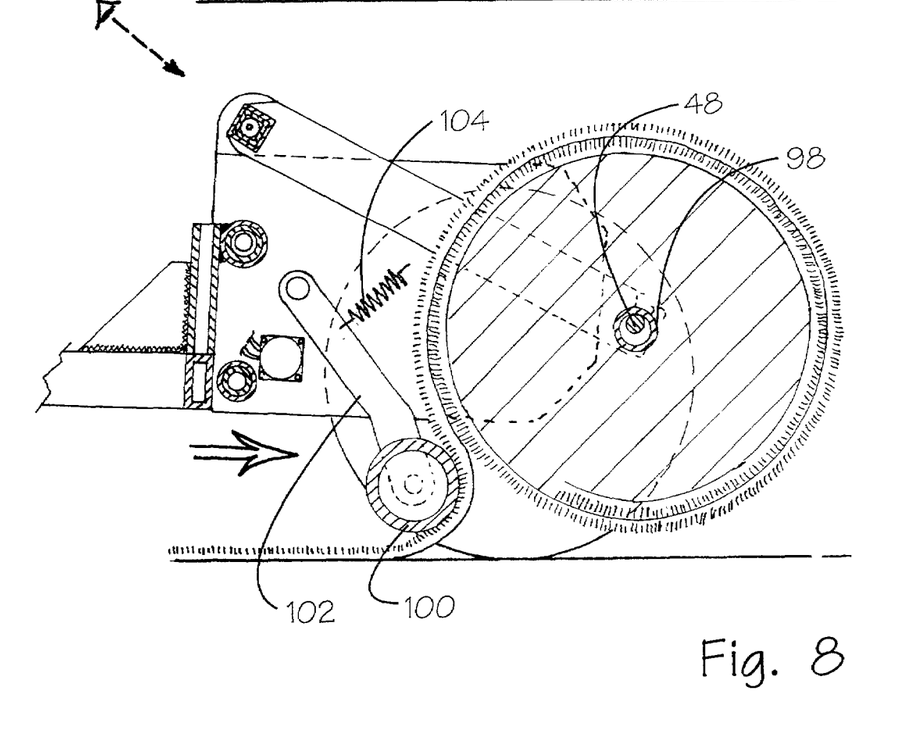
FIG. 8 is a side sectional detail of an alternative embodiment of a sod roll handling mechanism adapted for rolls made with the grass side of the sod outermost.

FIG. 8 shows the same section as FIG. 7 but with the sod roll 41 having been rolled with the grass outermost rather than having the dirt outside. A roller 100 is fitted behind the sod roll 41 close to the ground. A bar or roller connector 102 connects the auxiliary roller 100 to the frame 22 and a roller positioner or biasing means 104 holds the auxiliary roller 100 in the appropriate position.

Figure 9:
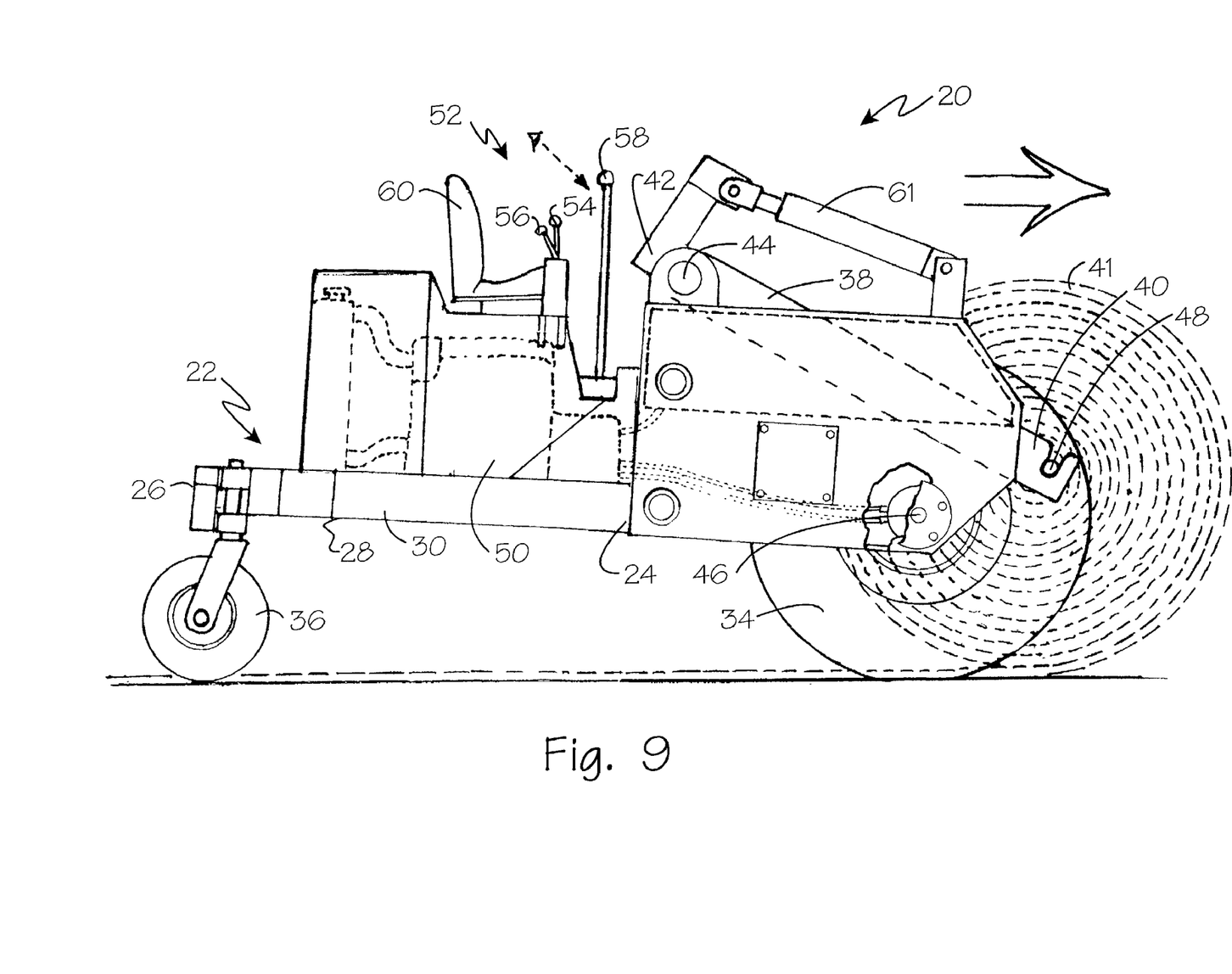
FIG. 9 is an alternative embodiment of the sod roll laying apparatus wherein the hydraulic drive motors are directly linked to the drive wheels.

FIG. 9 shows a side elevation of the sod layer 20 with a drive wheel spindle axis-mounted direct drive motor 106 that supports the frame from the drive wheels 32 34.

Changes and modifications in the specifically described embodiments can be carried out without departing from the scope of the invention which is intended to be limited only by the scope of the appended claims.

DRAWING REFERENCE NUMBERS 20 sod laying machine
22 frame
24 forward end
26 rearward end
28 left side
30 right side
32 right front wheel
34 left front wheel
36 rear wheel
38 elongated arm
40 roll end
41 sod roll
42 pivot end
44 pivot axis
46 front wheel axis
48 sod roll support shaft
50 drive system
52 operator control station
54 roll lift control
56 drive wheel width control
58 travel speed and direction
60 operator seat
61 arm pivot cylinder
62 hydraulic cylinder for wheel spacing adjustment
64 hydraulic power hoses
66 upper telescoping member
68 upper fixed member
70 lower telescoping member
72 lower fixed member
74 left drive wheel box frame
76 right drive wheel box frame
78 left tank
80 right tank
82 hydraulic motor
84 hydraulic pump
86 prime mover
88 drive chain or belt
90 drive wheel spindle
92 idler caster assembly
94 rear wheel rocking beam
96 rocking beam pivot
98 sod roll core
100 auxiliary roller
102 roller connector control
104 roller positioner
106 drive wheel spindle axis-mounted direct drive motor

What is claimed is:

1. A self-propelled operator-carrying vehicular sod laying machine for supporting, transporting, placing and unrolling sod rolls upon a surface comprising:
   a frame having a forward end, a rearward end, a left side, and a right side;
   a plurality of wheels mounted to the frame for rolling transport of the frame along a surface, wherein the wheels include at least one rear idler caster wheel assembly affixed proximate the rearward end of the frame, a first front wheel located proximate the forward end at the right side, a second front wheel located proximate the forward end at the left side, the first front wheel and the second front wheel being adapted to define an axis of the front wheels;
   a left wheel box frame affixed to the first front wheel and a right wheel box frame affixed to the second front wheel;
   a pair of generally parallel, laterally displaceable elongated arms including a first arm actuated by a vehicle-powered means and a second arm actuated by a vehicle-powered means, the first arm and the second arm disposed between the front wheels and extending forwardly from the forward end of the frame, the first arm and second arm each having a roll end and a pivot end, the pivot end being pivotably attached to the frame to pivot on an axis parallel to the axis of the front wheels to cause vertical displacement of the roll end of the arms;
   wherein the lateral displacement between the arms is adjustable to operator-selectable distances by operator actuation of the vehicle-powered means for lateral simultaneous movement of the first arm together with the left wheel box frame, and for lateral simultaneous movement of the second arm with the right wheel box frame;
   a sod roll supporting shaft attachable to the roll ends of the arms; and
   a drive system for rotating the front wheels and pivoting the arms to vary the lateral displacement of the arms.

2. The sod laying machine defined in claim 1, further comprising an operator control station proximate the forward end of the frame, the control station including controls for pivoting the arms for vertical movement of the roll ends, controls for lateral movement of the arms to vary the distance between the arms and controls for the speed and direction of the wheel rotating drive system.

3. The sod laying machine defined in claim 2, wherein the operator control station is further comprised of an operator-carrying seat.

4. The sod laying machine defined in claim 3, further comprising a hydraulic drive means for laterally displacing the first arm relative to the second arm to accommodate a plurality of sod roll widths.

5. The sod laying machine defined in claim 4, wherein the drive means for pivoting the arms is comprised of a hydraulic cylinder.

6. The sod laying machine defined in claim 4, wherein the drive means for rotating the wheels is comprised of independently controllable hydraulic motors rotatably attached to the front wheels.

7. A self-propelled operator-carrying vehicular sod laying machine for supporting, transporting, placing and unrolling sod rolls upon a surface comprising:
   a frame having a forward end, a rearward end, a left side and a right side;
   a plurality of wheels mounted to the frame for rolling transport of the frame along a surface, a front wheel being located proximate the forward end at the right side, a front wheel being located proximate the forward end at the left side, and at least one rear idler caster wheel affixed proximate the frame rearward end;
   a pair of generally parallel, laterally displaceable elongated arms disposed between the front wheels and extending forwardly from the frame forward end, each of the arms having a roll end and a pivot end, the pivot end being pivotably attached to the frame to pivot on an axis parallel to the axis of the front wheels to cause vertical displacement of the roll end of the arms;
   a sod roll supporting shaft attachable to the roll ends of the arms;

a hydraulic drive system for laterally displacing the arms;

a hydraulic actuator for pivoting the arms;

a left drive wheel hydraulic drive motor rotatably linked exclusively to the left front wheel;

a right drive wheel hydraulic drive motor rotatably linked exclusively to the right front wheel; and an operator control station proximate the forward end of the frame, the control station including controls for pivoting the arms for vertical movement of the forward ends, controls for lateral movement of the arms to vary the distance between the arms, controls for independently controlling the speed and direction of rotation of each drive wheel and an operator-carrying seat.

8. The sod laying machine defined in claim 7, wherein the drive means for rotating the wheels is continuously variable speed hydraulic motors.

9. The sod laying machine defined in claim 8, wherein each rear wheel is further comprised of an idler caster wheel assembly.

10. The sod laying machine defined in claim 9, wherein the drive means for rotating the wheels has a multiplicity of drive speeds including higher speeds for sod roll transport and lower speeds for sod roll placement.

11. The sod laying machine of claim 8, wherein the drive means for rotating the wheels has a multiplicity of drive speeds including higher speeds for sod roll transport and lower speeds for sod roll placement.

12. The sod laying machine defined in claim 7, further comprising at least two rear wheels that are idler caster wheels.

13. The sod laying machine of claim 12, wherein the drive means for rotating the wheels has a multiplicity of drive speeds including higher speeds for sod roll transport and lower speeds for sod roll placement.

14. The sod laying machine of claim 13, wherein the left drive wheel is rotatably affixed to a left box frame member and the right drive wheel is rotatably affixed to a right box frame member, the box frame members extending forward from the frame, and each box frame member being linked to an arm so that the distance between the drive wheels and the distance between the arms may be varied simultaneously by actuating of a single hydraulic cylinder.

15. The sod laying machine of claim 14, wherein a fluid tank is formed within a box frame member.

16. A method for making a self-propelled, operator-carrying vehicular sod laying machine for supporting, transporting, placing and unrolling sod rolls upon a surface comprising the scope of:

forming a frame having a forward end, a rearward end, a left side and a right side;

rotatably mounting a plurality of wheels to the frame for rolling transport of the frame along a surface, a front wheel being located proximate the forward end at the right side, a front wheel being located proximate the forward end at the left side and at least one rear wheel being located proximate the rearward end;

forming a pair of elongated arms, each with a roll end and a pivot end, pivotably mounting to the frame, the pair of generally parallel, laterally displaceable, spaced-apart, elongated arms between the front wheels and extending each of the arms forwardly from the frame forward end, the pivot being pivotable on an axis parallel to the axis of the front wheels to cause vertical displacement of the roll end of the arms;

removeably attaching a sod roll supporting shaft to the roll ends of the arms;

operably attaching a hydraulic actuator for laterally displacing the arms;

operably attaching a hydraulic actuator for pivoting the arms;

installing a left drive wheel hydraulic drive motor rotatably linked exclusively to the left front wheel;

installing a right drive wheel hydraulic drive motor rotatably linked exclusively to the left front wheel;

installing an operator control station proximate the forward end of the frame, the control station including controls for pivoting the arms from vertical movement of the forward ends, controls for lateral movement of the arms to vary the distance between the arms, controls for independently controlling the speed and direction of rotation of each drive wheel, and an operator-carrying seat; and linking the box beam members to which the drive wheel assemblies are attached so as to adjust the separation between the front drive wheels simultaneously with adjustment of the arm spacing.

17. The method of claim 16, further comprising the step of installing continuously variable speed hydraulic front wheel drive motors.

18. The method of claim 17, further comprising the step of installing an idler caster wheel at the rearward portion of the frame.

19. The method of claim 18, further comprising the step of installing a rear wheel rocking beam fitted with a ground-contacting idler caster wheel assembly proximate each end, the rocking beam being pivotable on an axis generally perpendicular to the axis of the front wheels to facilitate vertical displacement of the rear wheels.

20. The method of claim 19, further comprising the step of installing wide floatation tires at the front driving wheels.

* * * * *